Figure 1:
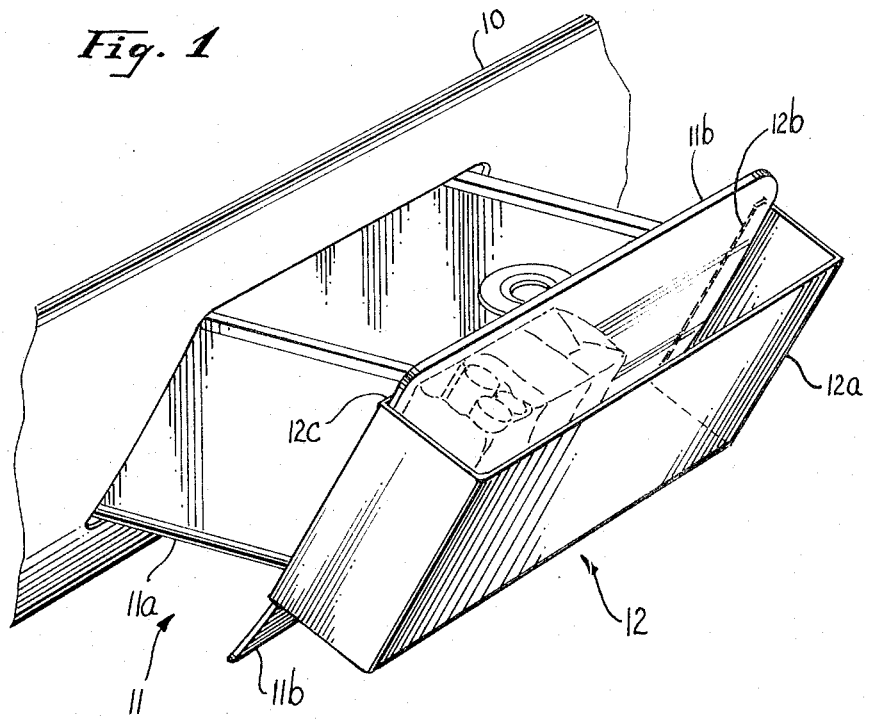

Jan. 3, 1967     H. SCHNEIDER     3,295,669

CIGARETTE-HOLDING DEVICE

Filed June 14, 1965

INVENTOR
HERTHA SCHNEIDER
BY Allen E. Botney
ATTORNEY

United States Patent Office 3,295,669
Patented Jan. 3, 1967

3,295,669
CIGARETTE-HOLDING DEVICE
Hertha Schneider, 10562 Kinnard Ave.,
Los Angeles, Calif. 90024
Filed June 14, 1965, Ser. No. 463,692
3 Claims. (Cl. 206—19.5)

The present invention relates in general to ash trays of the type mounted on the dashboards of motor vehicles, such as automobiles and trucks, and more particularly relates to a cigarette-holding device for such types of ash trays.

Almost everyone driving a motor vehicle has had trouble, or difficulty, or suffered inconvenience at one time or other in finding a place in the vehicle for their cigarettes. Most people either throw the pack of cigarettes on the seat alongside them, or put it on top of the dashboard, or keep it in a pocket of their attire. This means that the driver of the vehicle has to grope for them and oftentimes, because they have become displaced due to the motion of the vehicle, has to take his eyes off the road to find them, an obviously undesirable arrangement. Devices in which cigarettes may be placed have been manufactured and are presently available that mount or stand on the dashboard in the proximity of the windshield, but these are general purpose devices and, therefore, are usually cluttered up with many things that obscure the position of cigarettes placed therein. Accordingly, such devices really do not resolve the problem.

It is, therefore, an object of the present invention to provide an apparatus that will keep a pack of cigarettes in a fixed, known position in the vehicle.

It is another object of the present invention to provide a cigarette-holding device for motor vehicles that will help to minimize the risk to the driver when reaching for a cigarette.

It is a further object of the present invention to provide a device in which cigarettes may be stored in a logically and conveniently located spot in the vehicle without, in any way, detracting from the appearance of the dashboard.

The above-mentioned objects are achieved by means of the present invention which provides a cigarette-holding device that is either mounted on the ashtray of a motor vehicle or fabricated together with the ash tray as an inherent part thereof. More particularly, the ash tray in a motor vehicle is located to provide easy access to it and, furthermore, its exact position on the dashboard is always well known or remembered by the driver. Accordingly, the ashtray would be the logical place whereat to mount a cigarette-holding device, and it is in accordance with the concept of the present invention to do so. In one embodiment of the invention, the cigarette-holding device is fabricated separately from the ash tray but is adapted to be mounted on it. In another embodiment of the invention, the ash tray and the cigarette-holding device are manufactured as a unit so that the device is an inherent part thereof. In either case, the device is on the front face of the ash tray and, therefore, easily reached and used. It will be recognized that a device of this kind contributes to safe driving because it eliminates any necessity for the driver to divert his attention from the road when attempting to obtain a cigarette. The novel features which are believed to be characteristic of the invention, both as to its organization and method of operation, together with further objects and advantages theref, will be better understood from the following description considered in connection with the accompanying drawing in which a couple of embodiments of the invention are illustrated by way of example. It is to be expressly understood, however, that the drawing is for the purpose of illustration and description only, and is not intended as a definition of the limits of the invention.

Figure 2:
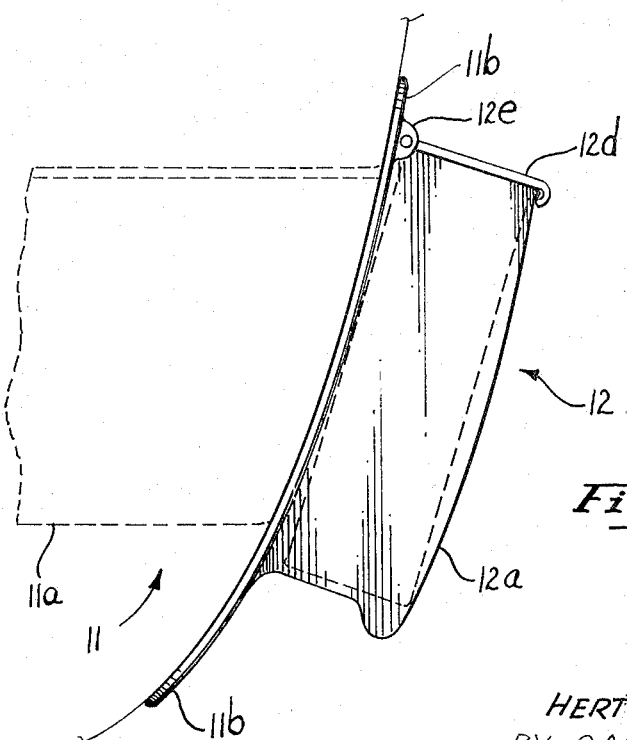

FIGURE 1 is a perspective view of a first embodiment of the present invention as it is mounted on an ash tray and illustrates, in outline, a pack of cigarettes positioned therein; and FIGURE 2 is a side view of a second embodiment of the invention manufactured with the ash tray as a unit.

For a detailed description of the invention, reference is now made to the drawing wherein like or similar parts or elements have been given like or similar designations throughout the figures. Referring particularly to FIG. 1, a dashboard 10 is shown therein on which is slideably mounted an ash tray device generally designated 11, the ash tray being basically comprised of a box-shaped structure 11a and a frontface panel 11b. Structure 11a is open at the top to receive used cigarettes and is adapted to slide in and out of the dashboard in a well-known manner. Frontface panel 11b is, as its name implies, mounted on the front end of structure 11a and, in fact, is its front wall. Furthermore, panel 11b is of such a size that its edges extend beyond the body of the ash tray, namely, beyond structure 11a, and curves or arcs inwardly toward the dashboard.

Mounted on ash tray 11, specifically on frontface panel 11b, is a cigarette-holding device, generally designated 12, that comprises a box-shaped structure 12a of rectangular cross-section whose length is substantially the same as that of panel 11b and whose width dimensions are such that a pack of cigarettes may fit loosely therein in an upright position. Device 12 is open on its back side but makes use of the panel as its back wall or side in its position on the panel. Toward this end, cigarette-holding device 12 includes a pair of spring-loaded U-shaped elements 12b and 12c that respectively slip over the edges of the panel to slideably hold the device in place. In mounting the device 12, elements 12b and 12c are slipped over and in back of the edges of the panel, and when this is done, the device is then pushed down until it can go no further, the downward displacement of the device being limited by the inward curvature or arcing of the panel. More specifically, the elements 12b and 12c being straight, they abut tightly against the panel due to its curvature when the cigarette-holding device is fully in place, thereby automatically positioning the device and holding it in place. With device 12 mounted, a pack of cigarettes may now be stored in it as is illustrated in outline form in the figure.

Whereas the embodiment in FIG. 1 is manufactured separately or apart from the ash tray and later mounted on it in the manner described above, a cigarette-holding device according to the present invention may be fabricated together with the ash tray as a unit, as is shown in FIG. 2 to which reference is now made. As shown therein, in this embodiment panel 11b is not only the front side or wall of structure 11a, but is also the back side or wall of structure 12a, with the result that the panel constitutes a common side or wall therebetween. Thus, in this instance, structure 12 is integral with and extends from panel 11b and, therefore, is an inherent part thereof, with the result that the need for elements 12b and 12c in order to mount the device is thereby eliminated. Also shown in this embodiment is a cover 12d that is rotatable about hinges 12e, the cover being desirable for obvious reasons.

Although a couple of particular arrangements of the invention have been illustrated above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. In a motor vehicle, the combination comprising: an ash tray slideably mounted on the dashboard of the vehicle, said ash tray having a frontface panel whose edges extend beyond its body; and a device for holding cigarettes mounted on the frontface panel of said ash tray, said device being rectangularly shaped and including means for slideably mounting it on said ash tray panel, said means being a pair of spring-loaded U-shaped elements that respectively slip over the edges of said panel to slideably hold said device in place.

2. In a motor vehicle, the combination comprising: an ash tray slideably mounted on the dashboard of the vehicle, said ash tray having an inwardly arcing frontface panel whose edges extend beyond its body; and a rectangular-shaped device for holding cigarettes mounted on the frontface panel of said ash tray, said device including first means for slideably mounting it on said ash tray and second means that makes use of the inward arcing of said panel to limit its downward displacement, said first means being a pair of spring-loaded U-shaped elements that respectively slip over the edges of said panel to slideably hold said device in place.

3. An ash tray device for the dashboard of motor vehicles, said ashtray device comprising: a first box-shaped structure that is mounted on and adapted to slide in and out of the dashboard, said structure being open at the top to receive used cigarettes; and a second box-shaped structure mounted onto the front end of said first box-shaped structure, the front and rear walls of said first and second structures, respectively, being a common wall therebetween, said second box-shaped structure being adapted to store at least one pack of cigarettes.

References Cited by the Examiner

UNITED STATES PATENTS

| | | |
|---|---|---|
| 1,289,978 | 12/1918 | Ward. |
| 1,625,011 | 4/1927 | Wolfe _____ 224—42.42 X |
| 2,633,278 | 3/1953 | Muniz _____ 224—42.46 |
| 2,982,393 | 5/1961 | Erbst _____ 206—19.5 |
| 3,014,759 | 12/1961 | Bing. |
| 3,201,018 | 8/1965 | Moody _____ 224—29 X |

GERALD M. FORLENZA, *Primary Examiner.*

W. F. WERNER, *Assistant Examiner.*